United States Patent
Tsai et al.

(10) Patent No.: US 8,285,053 B2
(45) Date of Patent: Oct. 9, 2012

(54) CODEBOOK GENERATING METHOD

(75) Inventors: Cheng-Fa Tsai, Pingtung (TW); Jiun-Huang Ju, Pingtung County (TW)

(73) Assignee: National Pingtung University of Science & Technology, Neipu Hsiang, Pingtung County (TW)

(*) Notice: Subject to any disclaimer, the term of this patent is extended or adjusted under 35 U.S.C. 154(b) by 235 days.

(21) Appl. No.: 12/828,730

(22) Filed: Jul. 1, 2010

(65) Prior Publication Data

US 2011/0026830 A1 Feb. 3, 2011

(30) Foreign Application Priority Data

Jul. 31, 2009 (TW) ................ 98125883 A

(51) Int. Cl.
*G06K 9/46* (2006.01)
*G06K 9/36* (2006.01)

(52) U.S. Cl. ...................... 382/190; 382/232

(58) Field of Classification Search .......... 382/164, 382/165, 168, 170, 173, 190, 224, 225, 240, 382/243, 253, 254, 274, 275; 375/240.22, 375/E7.209; 704/219; 341/51, 87; 708/235; 706/25, 44

See application file for complete search history.

(56) References Cited

U.S. PATENT DOCUMENTS

| | | | |
|---|---|---|---|
| 5,255,346 A * | 10/1993 | Wu et al. | 706/25 |
| 5,836,003 A * | 11/1998 | Sadeh | 341/51 |
| 6,269,333 B1 | 7/2001 | Ravishankar | |
| 6,421,467 B1 * | 7/2002 | Mitra | 382/240 |
| 6,438,266 B1 * | 8/2002 | Bajaj et al. | 382/243 |
| 6,438,268 B1 * | 8/2002 | Cockshott et al. | 382/253 |
| 6,807,312 B2 | 10/2004 | Thomas et al. | |
| 6,968,092 B1 | 11/2005 | Winger | |
| 7,120,300 B1 * | 10/2006 | Sankar | 382/190 |
| 2007/0118365 A1 * | 5/2007 | Chu | 704/219 |
| 2010/0228808 A1 * | 9/2010 | Ragot et al. | 708/235 |
| 2011/0026830 A1 * | 2/2011 | Tsai et al. | 382/190 |
| 2011/0066580 A1 * | 3/2011 | Tsai et al. | 706/25 |

* cited by examiner

*Primary Examiner* — Amir Alavi

(74) *Attorney, Agent, or Firm* — Muncy, Geissler, Olds & Lowe, PLLC

(57) ABSTRACT

A codebook generating method comprises a dividing and transforming step dividing an original image into original blocks and transforming each of the original blocks into an original vector; a parameter setting step setting a distortion tolerance and a predetermined number of representative blocks; a single group setting step setting the original vectors as a group; a preliminary grouping step grouping all the original vectors in a group currently having largest distortion into two groups using a grouping algorithm, wherein the preliminary grouping step is repeated until the number of groups is equal to the predetermined number of representative blocks; and a grouping step grouping all the original vectors based on a plurality of initial centroids to obtain final centroids, and storing vectors corresponding to the final centroids in a codebook, wherein the centroids of the groups are treated as the initial centroids.

5 Claims, 4 Drawing Sheets

CODEBOOK GENERATING METHOD

BACKGROUND OF THE INVENTION

1. Field of the Invention

The present invention generally relates to a codebook generating method and, more particularly, to a codebook generating method in use of image compression.

2. Description of the Related Art

Generally speaking, there are two ways of image compression: "lossy" compression and "lossless" compression. The lossy compression may produce an image with more distortion but achieve a high compression rate. The lossless compression may reconstruct an image without any distortion. However, the lossless compression can't achieve the high compression rate as the lossy compression. The image compression technique may be performed under two domains: frequency domain and spatial domain, as shown in Table 1 below:

TABLE 1

Categories of Image Compression

|  | Lossy Compression | Lossless Compression |
| --- | --- | --- |
| Frequency Domain | JPEG | PNG |
| Spatial Domain | The Invention | GIF |

For the lossy compression in spatial domain, a codebook is generally generated by a codebook generating method. The codebook has a smaller size than the original image and is thus used to replace the original image for image preservation and transmission. On the contrary, during the image decompression, the codebook is decoded by a decoding algorithm to obtain a plurality of reconstructed blocks. The reconstructed blocks are then combined into a reconstructed image for image decompression.

The conventional codebook generating method usually performs a dividing procedure on an original image to obtain a plurality of original blocks with smaller volume. The original blocks are then converted into a plurality of original vectors by a Vector Quantization mechanism. Finally, a decoding algorithm is used to decode the original vectors to obtain a plurality of code words. The code words have smaller quantity than the original blocks and are representative of the original image. Based on this, the codebook is constructed by the code words.

A conventional decoding algorithm such as a LBG algorithm was proposed by Linda, Buzo and Gray in 1980. The idea of the LBG algorithm is similar to the K-means method known in data clustering methods. In a first step of the LBG algorithm, a value of a distortion index $\epsilon$, as well as a number K which the original vectors are to be grouped, are firstly defined. In a second step of the LBG algorithm, K original vectors are randomly selected from the plurality of original vectors to be centroids. In a third step of the LBG algorithm, a Euclidean distance between each original vector and centroid is calculated so that each original vector may be assigned to a corresponding centroid. In a fourth step of the LBG algorithm, a centroid of the original vectors in each group is determined and the determined centroid is defined as a new centroid. In a fifth step of the LBG algorithm, a difference between the new and old centroids in each group, namely, the distortion, is calculated. If the calculated distortion is not smaller than the value of the distortion index $\epsilon$, the third step is repeated. If the calculated distortion is smaller than the value of the distortion index $\epsilon$, the whole procedure is terminated. The finally obtained centroids may serve as the code words forming the codebook.

Generally, the aforementioned LBG algorithm initially is performed in a random manner. In addition, the original vectors are in larger number and more complex. Therefore, the obtained result of the LBG algorithm is somewhat unstable. Furthermore, the value of the distortion index $\epsilon$ is usually set smaller in order to have a better image quality. As a result, the condition of convergence is stricter, resulting in a slower training. Moreover, a longer training time period is resulted as every original vector requires calculation of the Euclidean distance.

Another conventional decoding algorithm such as Self-Organizing Map (SOM) is a non-monitoring artificial neural network proposed by Kohonen in 1980. In the SOM method, an artificial neural network consists of a plurality of neurons. The artificial neural network is used to train all the original pixels and adjust linking values thereof during the training. The training procedures are illustrated below.

In a first step of the SOM method, a difference between each original vector and neuron is calculated.

In a second step of the SOM method, the neuron having a smallest difference with a current original vector is determined, and the determined neuron is defined as a winning neuron.

In a third step of the SOM method, a weight linking value between the current original vector and the winning neuron is adjusted.

In a fourth step of the SOM method, the first to third steps are repeated until all original vectors are trained. Thus, a training cycle is finished. The SOM method is terminated when a predetermined number of times of training cycles are finished. By this time, a plurality of representative blocks forming the codebook is obtained.

The above SOMs coding algorithm requires a massive calculations to obtain a desired neural network. The more the original vectors or the neurons are, the longer the time period is required for calculations. Thus, a lower efficiency is resulted.

Another conventional hierarchical SOMs (HSOM) coding algorithm was proposed. The main idea of the HSOM method is dividing the calculations of the SOM method into two levels. For example, assume that there are 256 (16×16) neurons defined in the SOM method; in this case, the time complexity is higher. Based on this, the HSOM method firstly performs a first-level training on the original vectors using 16 neurons according to the SOM method, and then assigns the original vectors to the 16 neurons to obtain 16 groups of original vectors. Subsequently, the HSOM method performs a second-level training on each group of original vectors using 16 neurons according to the SOM method. Finally, 16 neurons are obtained in each group of original vectors. As a result, 256 neurons (16×16) are obtained and serve as the representative blocks forming the codebook, thus reducing the time complexity of the SOM method.

However, since each group has different number of original vectors but all the groups are trained using the same rather than different number of neurons during the second-level training, it is not easy to obtain the real distribution of the original vectors. Thus, a drawback of low efficiency is raised.

Based on the above problems, it is desired to improve the conventional codebook generating method.

SUMMARY OF THE INVENTION

It is therefore the primary objective of this invention to improve the data compression quality by providing a codebook generating method in use of image compression.

It is another objective of the invention to provide a codebook generating method with less time consumption during image compression.

It is yet another objective of the invention to provide a codebook generating method which reduces the number of trained centroids during image compression.

It is yet another objective of the invention to provide a codebook generating method which reduces the number of trained original vectors during image compression.

The invention discloses a codebook generating method comprising a dividing and transforming step dividing an original image into original blocks and transforming each of the original blocks into an original vector; a parameter setting step setting a distortion tolerance and a predetermined number of representative blocks; a single group setting step setting the original vectors as a group; a preliminary grouping step grouping all the original vectors in a group currently having largest distortion into two groups using a grouping algorithm, wherein the preliminary grouping step is repeated until the number of groups is equal to the predetermined number of representative blocks; and a grouping step grouping all the original vectors based on a plurality of initial centroids to obtain final centroids, and storing vectors corresponding to the final centroids in a codebook, wherein the centroids of the groups are treated as the initial centroids.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
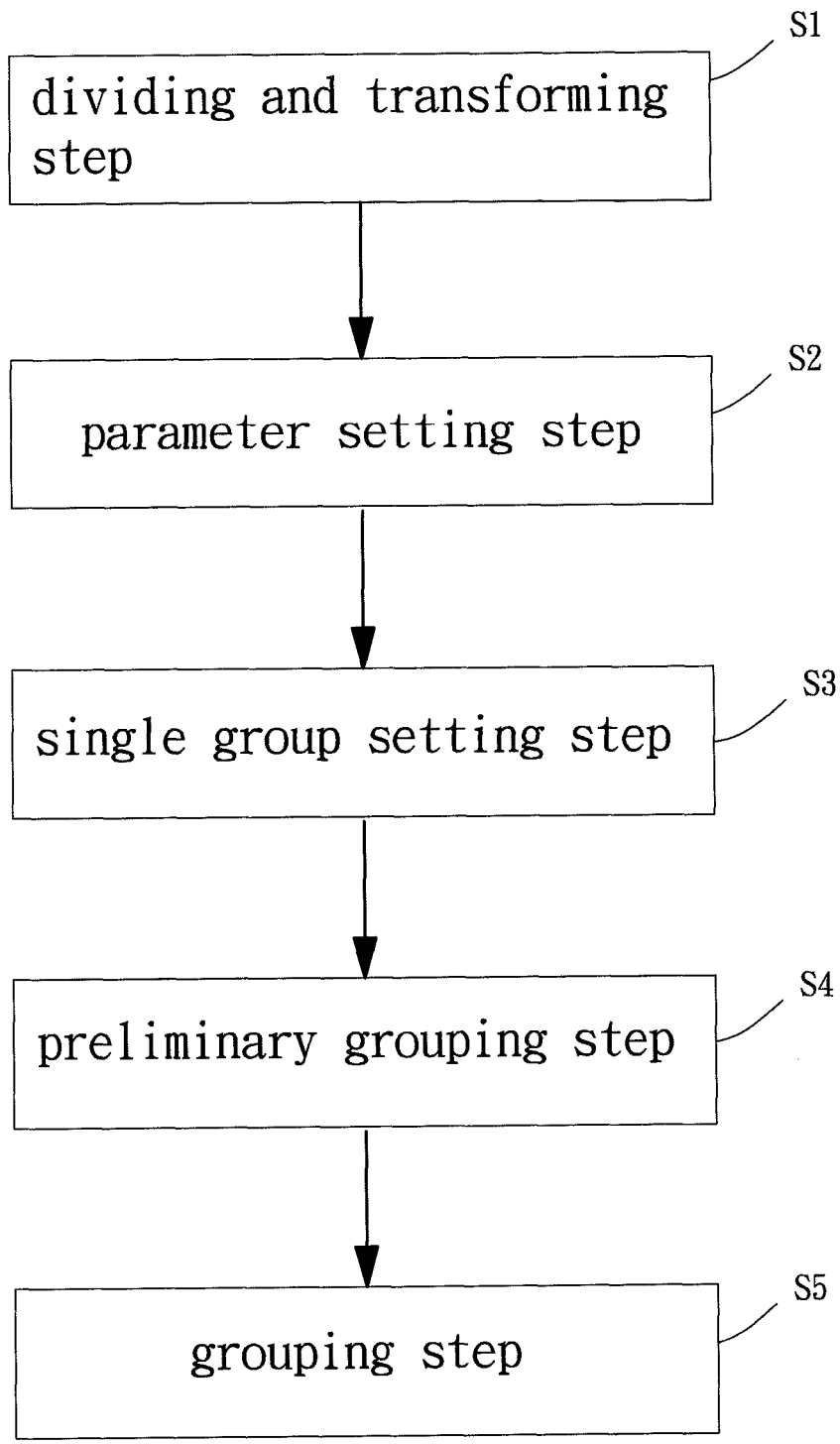
FIG. 1 shows a flowchart of a codebook generating method in use of image compression according to a preferred embodiment of the invention.

In the various figures of the drawings, the same numerals designate the same or similar parts. Furthermore, when the term "first", "second", "third", "fourth", "inner", "outer" "top", "bottom" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Referring to FIG. 1, a codebook generating method of the invention comprises a dividing and transforming step S1, a parameter setting step S2, a single group setting step S3, a preliminary grouping step S4 and a grouping step S5.

Referring to FIG. 1, the proposed codebook generating method is executed under a computer system in connection to at least a database having at least an original image consisting of a plurality of pixels.

Figure 2:
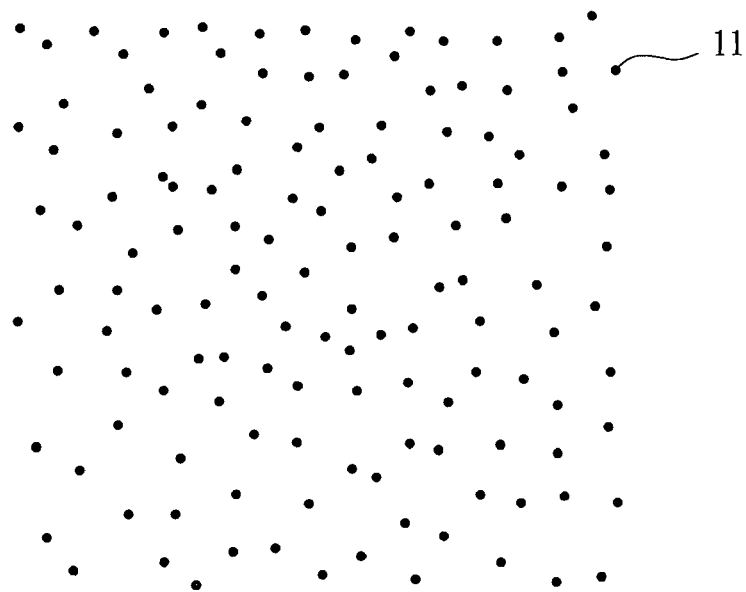
FIG. 2 shows a distribution of original vectors of the proposed codebook generating method.

Referring to FIGS. 1 and 2, the dividing and transforming step S1 is provided to divide the original image into a plurality of original blocks and transform the original blocks into a plurality of original vectors 11. For instance, if the original image is a picture with a size of 1024 by 256, the original image may be divided into 1024 original blocks, with each original block having 256 pixels. Following, all pixels in each original block is converted into an original vector 11 to be stored in the database.

Referring to FIGS. 1 and 2, the parameter setting step S2 is provided to set a distortion tolerance and a predetermined number of representative blocks. The distortion tolerance serves as a threshold value for training distortion. The predetermined number of representative blocks represents the number of representative blocks contained in a final codebook. Specifically, the distortion tolerance serves as a convergence threshold value for a subsequent dividing algorithm and the representative blocks represent the original blocks during image compression. The predetermined number of representative blocks is set with a certain number representative of the original blocks. For example, the distortion tolerance in the embodiment is set as 0.001. In addition, it is desired to represent the 1024 original blocks with 256 representative blocks, so the predetermined number of representative blocks is set as 256.

Figure 3:
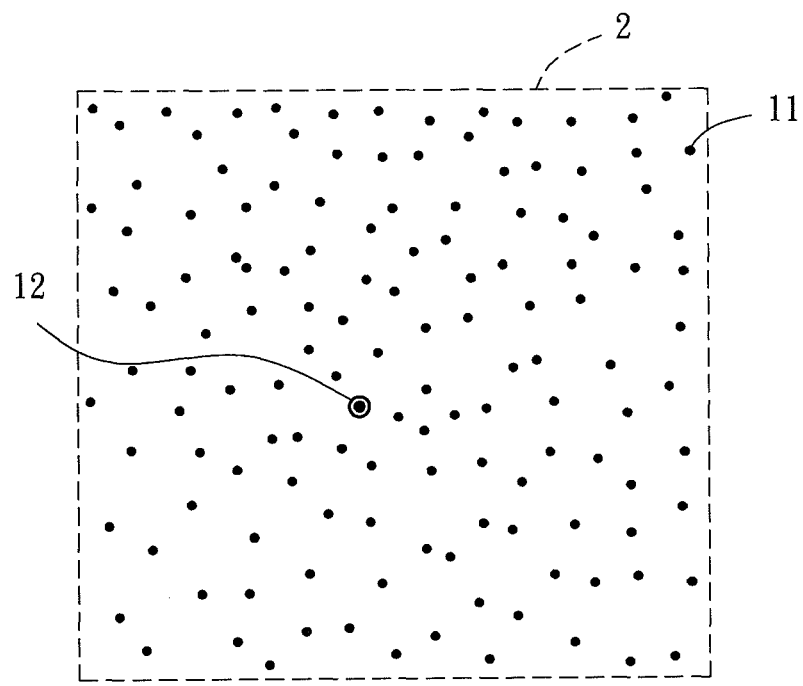
FIG. 3 shows a diagram of a single group setting step of the proposed codebook generating method.

Referring to FIGS. 1 and 3, the single group setting step S3 is provided to set all the original vectors 11 as a group 2 having a centroid 12 therein.

Figure 4:
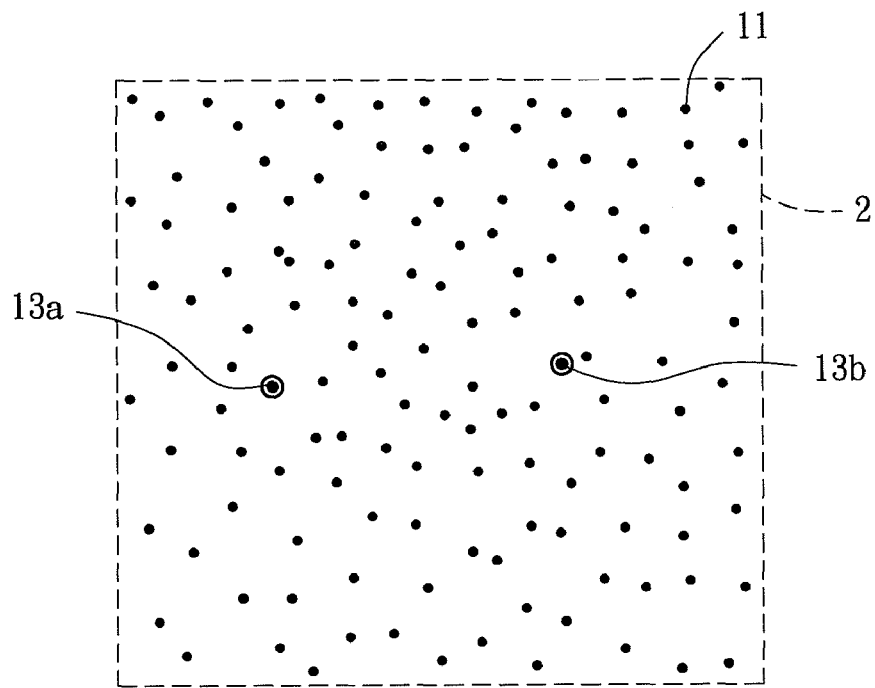
FIG. 4 shows a diagram of a preliminary grouping step of the proposed codebook generating method.
Figure 5:
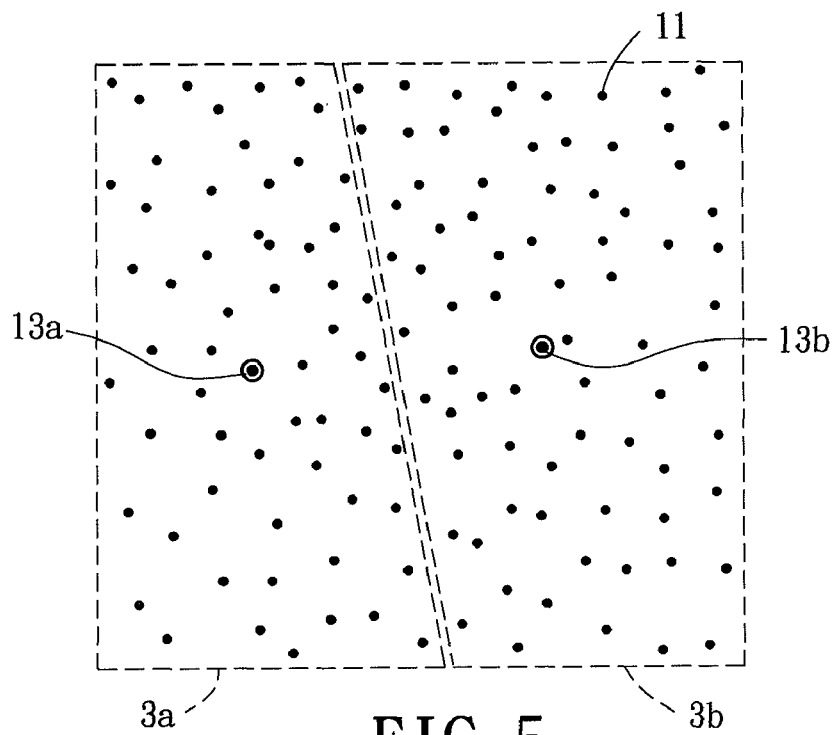
FIG. 5 shows a diagram of the preliminary grouping step grouping the original vectors into two groups.

Referring to FIGS. 1 and 4, the preliminary grouping step S4 is provided to group all the original vectors 11 in a group currently having largest distortion into two groups using a grouping algorithm. The step is repeated until the number of total groups reaches the predetermined number of representative blocks. Specifically, take FIG. 4 as an example, since there is only the group 2 in existence in the beginning, the group 2 is regarded as having highest distortion. Then, the centroid 12 is deleted and 2 out of the original vectors 11 are randomly selected as centroids 13a and 13b. The grouping algorithm is used to adjust the centroids 13a and 13b so as to divide the group 2 into two groups 3a and 3b, as shown in FIG. 5. In the embodiment, the grouping algorithm is LBG algorithm. The details of the LBG algorithm are described below.

A first step of the LBG algorithm is setting a number K for grouping. Here, the group 2 is to be grouped into two groups 3a and 3b, so the number K is set as 2. A second step of the LBG algorithm is randomly selecting 1 out of the original vectors 11 as a centroid 12. A third step of the LBG algorithm is calculating a Euclidean distance between the centroid 12 and each original vector 11 so as to assign the original vectors 11 to a corresponding centroid 12. A fourth step of the LBG algorithm is determining a centroid of the original vectors 11 in the group 2, and the centroid is treated as a new centroid. A fifth step of the LBG algorithm is determining a distortion between the new and old centroids, namely, the difference between the new and old centroids. If the distortion is not smaller than the distortion tolerance, the third step of the LBG algorithm is repeated. If the distortion is smaller than the distortion tolerance, the whole procedure is terminated. By far, the group 2 may be grouped into groups 3a and 3b. The calculation of distortion of the LBG algorithm is based on Mean Square Error (MSE) as shown in formula (a) below.

$$MSE = \sum_{g=1}^{Codewords} \frac{1}{GroupSize_g \times BlockSize} \sum_{n=1}^{GroupSize_g} \sum_{d=1}^{BlockSize} [i(x_{n_d}, y_{n_d}) - \bar{i}(x_{n_d}, y_{n_d})]^2 \quad (a)$$

However, in the embodiment, the calculation of distortion is based on Total Square Error (TSE) as shown in formula (b) below.

$$TSE = \sum_{g=1}^{Codewords} \sum_{n=1}^{GroupSize_g} \sum_{d=1}^{BlockSize} [i(x_{n_d}, y_{n_d}) - \bar{i}(x_{n_d}, y_{n_d})]^2 \quad (b)$$

In the formula (b), the variant "Codewords" means the number of groups to be grouped; the variant "$GroupSize_g$" means the number of the original vectors 11 in each group; the variant "BlockSize" means the dimensions of each original vector 11, which is 16 in maximum in the embodiment. In addition, the variant $i(x_{n_d}, y_{n_d}) - \bar{i}(x_{n_d}, y_{n_d})$ means the difference of each dimension between the new and old centroids.

Figure 6:
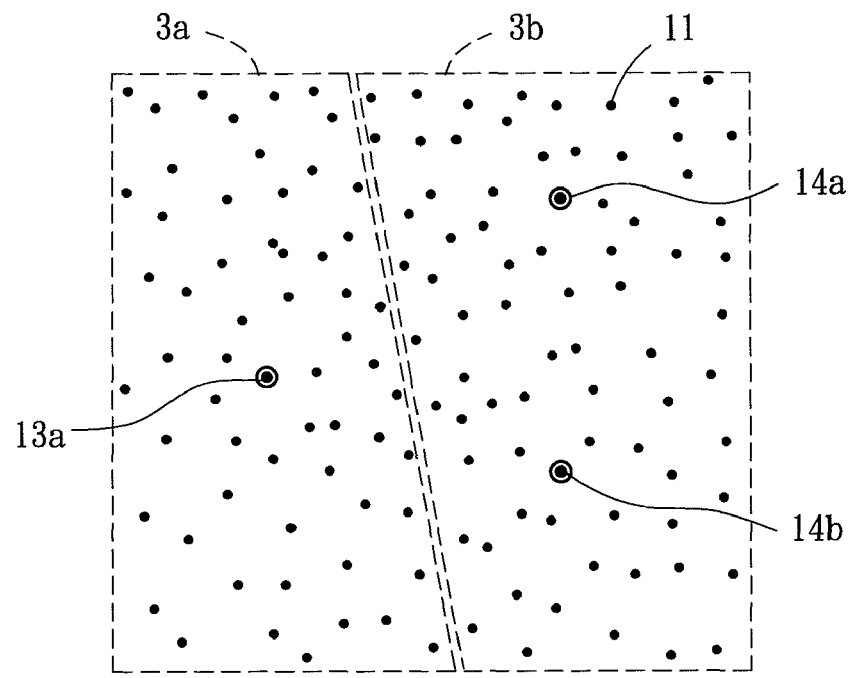
FIG. 6 shows a diagram of the preliminary grouping step randomly selecting two centroids.
Figure 7:
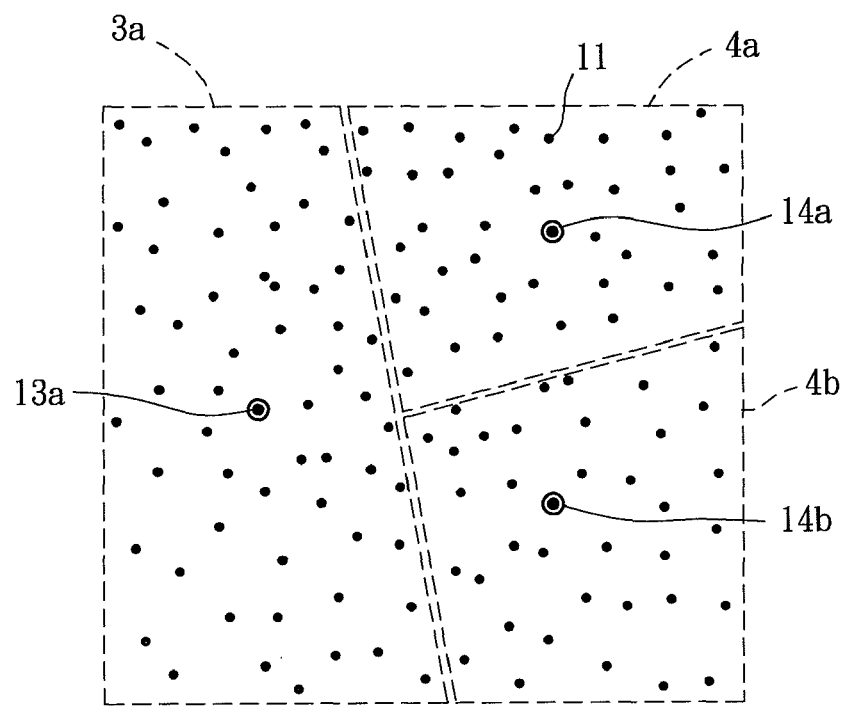
FIG. 7 shows a diagram of the preliminary grouping step dividing a group having a largest distortion into two groups.

Based on the current groups 3a and 3b obtained from the group 2 as described above, the number of current groups is 2, which is less than 256 —the predetermined number of representative blocks. Therefore, the preliminary grouping step S4 is repeated to re-group all the original vectors 11 in a group currently having largest distortion into two groups. Following, the distortion between the centroid 13a of the group 3a and the centroid 13b of the group 3b is compared using the TSE formula above. For example, if the centroid 13b of the group 3b has a higher distortion, then the group 3b is further grouped into two groups. Then, the centroid 13b of the group 3b is deleted and 2 out of the original vectors 11 in the group 3b are randomly selected as centroids 14a and 14b, as shown in FIG. 6. Following, the centroids 14a and 14b are constantly adjusted based on the TSE formula in order to group/divide the group 3b into two groups 4a and 4b as shown in FIG. 7. So far, there are 3 groups 3a, 4a and 4b, which is still less than 256—the predetermined number of representative blocks. Therefore, the preliminary grouping step S4 is repeated until the number of groups is equal to 256—the predetermined number of representative blocks.

Based on this, only the group currently having largest distortion is divided into two groups each time the preliminary grouping step S4 is performed, and fewer original vectors 11 are grouped using only two centroids. Therefore, not only the centroids but also the original vectors requiring calculations are significantly reduced. As a result, calculations may be finished in a shorter time period, i.e. the number of times of training is reduced. By the time the number of total groups reaches the predetermined number of representative blocks (256), 256 groups and centroids are obtained in the embodiment. That is, the preliminary grouping step S4 completes grouping of the original vectors 11 in a shorter time period to obtain 256 centroids. The 256 centroids obtained in the preliminary grouping step S4 have a great improvement in accuracy compared to the 256 centroids initially selected in the random manner by the conventional codebook generating method.

Referring to FIG. 1, in the grouping step S5, the obtained centroids of the groups are treated as initial centroids. Accordingly, the grouping step S5 groups all the original vectors 11 based on the initial centroids to obtain final centroids. The vector corresponding to the final centroids are stored in a codebook. Specifically, take the embodiment as an example, the 256 centroids obtained in the preliminary grouping step S4 are treated as initial centroids. Then, all the original vectors 11 are trained using a grouping algorithm and the 256 centroids are constantly adjusted until the distortion thereof is smaller than the distortion tolerance. Finally, the obtained 256 centroids are treated as final centroids. The vector corresponding to the final centroids are stored in a codebook. Here, the grouping algorithm is LBG algorithm. The distortion of the LBG algorithm may be calculated based on Mean Square Error as shown in the formula (a) above, so it is not described herein again for brevity.

With the proposed method, the 256 initial centroids obtained from the original vectors 11 are very close to the final centroids. Therefore, it won't take much time to perform the grouping step S5. Thus, the codebook is generated in a shorter time period, thereby reducing the time cost.

The vectors contained in the codebook obtained via the above steps may be converted into a plurality of representative blocks, each having a corresponding code. In this way, the original blocks of the original image may be compared with the representative blocks and the codes of the most similar representative blocks may represent the original blocks and serve as indices. In this way, the codebook with a smaller volume may represent the original image for compression purpose.

On the contrary, during the decompression, the codebook is decoded by a decoding algorithm and a plurality of reconstructed blocks is obtained via the indices. The reconstructed blocks are then combined into a reconstructed image, thus accomplishing the decompression.

Referring to Table 1, 6 pictures (test samples) are used to test the compression quality and compression time period of the invention. The 6 pictures are named Lena, Airplane, Peppers, Boat, Sailboat and Elsa, respectively. 30 rounds of independent calculations are taken to obtain an averaged result. The 6 pictures are 512 by 512 in size and 4 by 4 in blocks. In addition, the 6 pictures are gray scale images with 256 colors. Note the conventional HSOM method can not process the codebook with a size value that an integral value can not be obtained by taking a square root of the size value (such as 128 or 512). Therefore, some columns of the HSOM method do not have information and are thus marked as N/A (not available). A term PSNR (Peak Signal-to-Noise Ratio) is often used to evaluate the compression quality. The higher the PSNR is, the better the compression quality is. The formula of PSNR is listed below:

$$PSNR = 10\log_{10} \frac{255^2}{MSE} \quad (c)$$

The formula of MSE may be referred to the formula (a) above.

Based on the information in Table 1, the proposed codebook generating method does improves upon the conventional LBG, SOM and HSOM in terms of PSNR (compression quality) and calculation time (time cost).

TABLE 1

| | | Size of Codebook | | | | | | | |
|---|---|---|---|---|---|---|---|---|---|
| | | 128 | | 256 | | 512 | | 1024 | |
| Test Samples | Algorithm | PSNR | Timecost | PSNR | Timecost | PSNR | Timecost | PSNR | Timecost |
| Lena | LBG | 29.549 | 5.18 | 30.447 | 10.32 | 31.262 | 18.26 | 32.109 | 29.96 |
| | SOM | 29.677 | 227.98 | 30.581 | 434.13 | 31.471 | 832.02 | 32.436 | 1624.91 |
| | HSOM | N/A | N/A | 30.642 | 67.58 | N/A | N/A | 33.022 | 132.73 |
| | The invention | 29.697 | 3.21 | 30.758 | 5.60 | 31.929 | 8.87 | 33.386 | 14.87 |
| Airplane | LBG | 30.527 | 7.64 | 31.416 | 11.60 | 32.313 | 17.74 | 33.313 | 26.94 |
| | SOM | 31.115 | 229.30 | 32.124 | 424.82 | 33.156 | 831.29 | 34.319 | 1621.73 |
| | HSOM | N/A | N/A | 32.150 | 68.44 | N/A | N/A | 34.684 | 134.65 |
| | The invention | 31.173 | 3.15 | 32.306 | 5.46 | 33.542 | 8.65 | 35.029 | 14.86 |
| Peppers | LBG | 29.650 | 5.31 | 30.441 | 9.83 | 31.197 | 16.66 | 31.980 | 25.89 |
| | SOM | 29.777 | 227.66 | 30.600 | 436.20 | 31.390 | 828.78 | 32.305 | 1620.84 |
| | HSOM | N/A | N/A | 30.613 | 68.95 | N/A | N/A | 32.594 | 142.48 |
| | The invention | 29.798 | 3.09 | 30.712 | 5.29 | 31.660 | 8.76 | 32.698 | 14.04 |
| Boat | LBG | 29.068 | 7.19 | 29.896 | 11.50 | 30.733 | 17.96 | 31.670 | 26.60 |
| | SOM | 29.329 | 223.80 | 30.238 | 429.68 | 31.214 | 824.28 | 32.281 | 1610.44 |
| | HSOM | N/A | N/A | 30.175 | 67.88 | N/A | N/A | 32.475 | 134.40 |
| | The invention | 29.311 | 3.21 | 30.326 | 5.37 | 31.425 | 9.07 | 32.688 | 14.76 |
| Sailboat | LBG | 27.484 | 6.35 | 28.188 | 9.91 | 28.931 | 15.41 | 29.776 | 23.19 |
| | SOM | 27.713 | 231.38 | 28.500 | 434.88 | 29.334 | 837.35 | 30.298 | 1653.13 |
| | HSOM | N/A | N/A | 28.502 | 68.90 | N/A | N/A | 30.421 | 135.15 |
| | The invention | 27.689 | 2.97 | 28.564 | 5.18 | 29.484 | 8.71 | 30.543 | 14.21 |
| Elsa | LBG | 31.542 | 5.48 | 32.587 | 10.60 | 33.576 | 18.41 | 34.623 | 28.88 |
| | SOM | 31.887 | 231.73 | 32.905 | 440.23 | 33.992 | 833.84 | 35.130 | 1678.81 |
| | HSOM | N/A | N/A | 32.950 | 67.83 | N/A | N/A | 35.461 | 135.76 |
| | The invention | 31.932 | 3.14 | 33.096 | 5.46 | 34.311 | 9.70 | 35.687 | 15.67 |

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A codebook generating method, comprising:
   a dividing and transforming step dividing an original image into a plurality of original blocks and transforming each of the original blocks into an original vector;
   a parameter setting step setting a distortion tolerance and a predetermined number of representative blocks;
   a single group setting step setting the original vectors as a group;
   a preliminary grouping step grouping all the original vectors in a group currently having largest distortion into two groups using a grouping algorithm, wherein the preliminary grouping step is repeated until the number of groups is equal to the predetermined number of representative blocks; and
   a grouping step grouping all the original vectors based on a plurality of initial centroids to obtain final centroids, and storing vectors corresponding to the final centroids in a codebook, wherein the centroids of the groups are treated as the initial centroids.

2. The codebook generating method as claimed in claim 1, wherein the preliminary grouping step calculates the distortion based on Total Square Error.

3. The codebook generating method as claimed in claim 1, wherein the preliminary grouping step further deletes a centroid of the group currently having largest distortion, randomly selects two original vectors from the group currently having largest distortion as centroids, and divides the group currently having largest distortion into two groups using the grouping algorithm.

4. The codebook generating method as claimed in claim 1, wherein the grouping algorithm is LBG algorithm.

5. The codebook generating method as claimed in claim 1, wherein the grouping step groups all the original vectors based on the grouping algorithm.

* * * * *